United States Patent
Schalk et al.

(10) Patent No.: US 11,314,467 B2
(45) Date of Patent: Apr. 26, 2022

(54) DYNAMIC ADJUSTMENTS OF FILL LEVELS OF PRINT SUBSTANCE RESERVOIRS IN PRINTING DEVICES

(71) Applicant: Hewlett-Packard Development Company, L.P., Spring, TX (US)

(72) Inventors: Wesley R Schalk, Vancouver, WA (US); Jesse Sutherland, Vancouver, WA (US); Howard G Wong, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/048,336

(22) PCT Filed: Aug. 10, 2018

(86) PCT No.: PCT/US2018/046169
§ 371 (c)(1),
(2) Date: Oct. 16, 2020

(87) PCT Pub. No.: WO2020/032966
PCT Pub. Date: Feb. 13, 2020

(65) Prior Publication Data
US 2021/0064306 A1  Mar. 4, 2021

(51) Int. Cl.
*G06F 3/12* (2006.01)
*B41F 31/02* (2006.01)
*B41J 2/175* (2006.01)

(52) U.S. Cl.
CPC ............ *G06F 3/1219* (2013.01); *B41F 31/02* (2013.01); *B41J 2/175* (2013.01)

(58) Field of Classification Search
CPC .......... G06F 3/1219; B41F 31/02; B41J 2/175
See application file for complete search history.

(56) References Cited

U.S. PATENT DOCUMENTS

| | | | |
|---|---|---|---|
| 6,685,290 B1 | 2/2004 | Farr et al. | |
| 8,025,375 B2 | 9/2011 | Lu et al. | |
| 2003/0071862 A1 | 4/2003 | Tsukada et al. | |
| 2005/0057586 A1 | 3/2005 | Brenner | |
| 2009/0016743 A1 | 1/2009 | Tye et al. | |
| 2010/0214332 A1 | 8/2010 | Iwase | |
| 2016/0200115 A1 | 7/2016 | Nllyama | |

FOREIGN PATENT DOCUMENTS

| | | | |
|---|---|---|---|
| CN | 1744991 | 3/2006 | |
| CN | 104908461 | 9/2015 | |
| CN | 105984239 | 10/2016 | |
| CN | 106827821 | 6/2017 | |
| CN | 206367292 | 8/2017 | |
| DE | 3128887 | 2/1983 | |
| EP | 1037023 A1 * | 9/2000 | ............... B05C 1/02 |
| EP | 2918528 A1 * | 9/2015 | ............. B65H 9/004 |
| EP | 2918528 B1 | 12/2016 | |
| RU | 2197717 C2 * | 1/2003 | ............. B41J 2/175 |
| WO | WO-2017091406 | 6/2017 | |
| WO | WO-2017194913 A1 | 11/2017 | |

* cited by examiner

*Primary Examiner* — Bradley W Thies
(74) *Attorney, Agent, or Firm* — Mannava & Kang, P.C.

(57) ABSTRACT

An example printing device and method of the printing device is disclosed. A print substance usage parameter is determined based on a signal provided from a sensor coupled to a refillable reservoir in the printing device. A fill level of the refillable reservoir is dynamically adjusted with the print substance usage parameter.

12 Claims, 2 Drawing Sheets

DYNAMIC ADJUSTMENTS OF FILL LEVELS OF PRINT SUBSTANCE RESERVOIRS IN PRINTING DEVICES

BACKGROUND

Printing devices can include printers, copiers, fax machines, multifunction devices including additional scanning, copying, and finishing functions, all-in-one devices, or other devices such as pad printers to print images on three dimensional objects and three-dimensional printers (additive manufacturing devices). In general, printing devices apply a print substance often in a subtractive color space or black to a medium via a device component generally referred to as a print head. For example, printing devices that print in color mode may include supplies of subtractive color print substances such as cyan, yellow, magenta, and black or spot colors and printing devices that print in greyscale or monochromatic mode can include supplies of print substances such as black or a spot color. A medium can include various types of print media, such as plain paper, photo paper, polymeric substrates and can include any suitable object or materials to which a print substance from a printing device are applied including materials, such as powdered build materials, for forming three-dimensional articles. Print substances, such as printing agents, marking agents, and colorants, can include toner, liquid inks, or other suitable marking material that in some examples may be mixed with fusing agents, detailing agents, or other materials and can be applied to the medium.

DETAILED DESCRIPTION

Figure 1:
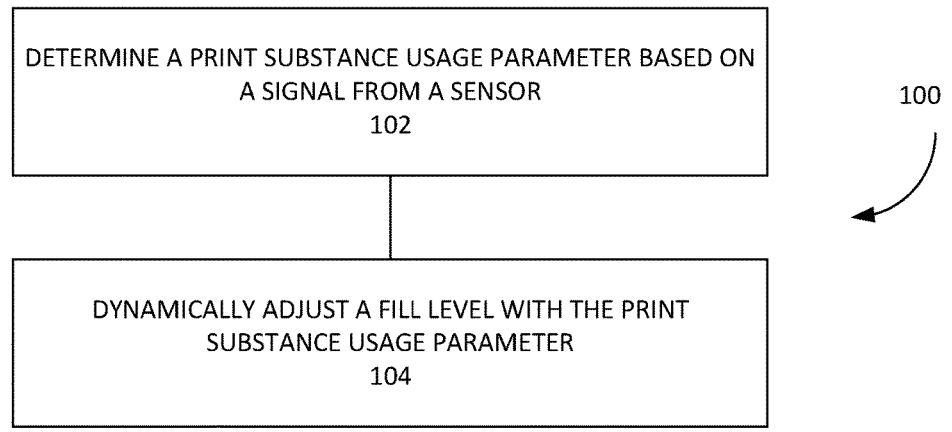
FIG. 1 is a block diagram illustrating an example method.

Printing devices with a continuous print substance supply system, such as continuous ink supply systems, include reservoirs to store print substance for use with the print head. The reservoirs are generally filled with print substance from a print substance supply at the discretion of the user. Users can determine an amount of print substance to provide to the reservoir and a frequency to provide the print substance to the reservoir. In general, the reservoir includes a statically set upper fill level to indicate when the reservoir is full of print substance and a statically set lower fill level to indicate when the reservoir is empty. A user or technician can provide print substance supply to the reservoir when the reservoir is empty up to the upper fill level.

This disclosure describes a printing device having a refillable reservoir with a dynamically adjustable fill level. A sensor, such as with a level sensor operably coupled to the refillable reservoir, is used to monitor an amount of print substance or print substance consumption of the printing device. The print substance usage parameter is detected based on a signal provided by the sensor. The fill level is dynamically adjusted with the print substance usage parameter, and the printing device can dynamically adjust an upper fill level or a lower fill level. The upper fill level can be adjusted to a selected threshold less than actual capacity of the refillable reservoir, and the lower fill level can be adjusted to a selected level greater than actual empty of the refillable reservoir. When the dynamically adjusted lower fill level is reached, the printing device may communicate an alert to fill the printing device with a print substance. In some examples, the lower fill level can be set to allow sufficient time to provide a new print substance supply based on expected print substance rate of consumption. In other examples, the lower and upper fill levels can be set to allow the print substance supply to empty all the print substance into the refillable reservoir. When the dynamically adjusted upper fill level is reached, the printing device can stop a pump providing print substance to the refillable reservoir. In some examples, the upper fill level can be set based on an expected print substance rate of consumption and other factors such as an expected service life of the printing device. Users are thus able to purchase and fill the appropriate amount of print substance to meet consumption and reduce waste. In some examples, the print substance supply can include a memory device having a data structure including information on the type of print substance and amount of print substance in the supply that can be read by the printing device and used to determine the dynamically adjusted fill level. The printing device can include an interface and a communication circuit to receive data that can determine the print usage parameter as well as provide alerts either at the printing device or via a computer network regarding whether to add print substance to the printing device.

FIG. 1 illustrates an example method 100 for use with a printing device. A print substance usage parameter is determined based on a signal provided from a sensor operably coupled to a refillable reservoir in the printing device at 102. In one example, the print substance parameter is based on a use of the print substance. An example of use of the print substance that can provide a basis of the print substance usage parameter can include an amount of print substance consumption as a function of time, a frequency of print substance consumption. Other bases of the print substance usage parameter can include an amount of time left in an expected use of the printing device or age of the printing device vis-à-vis an amount of print substance in the refillable reservoir. A fill level of the refillable reservoir is dynamically adjusted with the print substance usage parameter at 104.

The print substance usage parameter can include print substance use or amounts of print substance based on other measurable criteria. In one example, the print substance usage parameter can be determined, such as calculated, with a processor based on a signal provided from a level sensor operably coupled to the refillable reservoir indicative of an amount (such as volume) of print substance in the refillable reservoir. Print substance use can be determined, for example, by comparing different amounts of print substance in the refillable reservoir against a criterion such as time, amount of pages printed, or some combination of criteria. In another example, the print substance usage parameter can be determined with a process based on a signal provided from a flow sensor operably coupled to the refillable reservoir indicative of an amount of print substance leaving the refillable reservoir. Print substance use can be determined, for example, by counting amounts of print substance flow from the refillable reservoir against a criterion such as time, amount of pages printed, or some combination of criteria. The controller can be programmed to resolve information regarding time (including date) from an internal clock or external inputs to determine the print substance use parameter. In one example, the print substance usage parameter can be based on a rate of print substance consumption.

As indicated, examples of print substance use can include an amount of print substance use as a function of time, such as an amount of print substance used over a selected period of historical time. For instance, a print substance usage parameter can be determined based on the amount of print substance used since the previous time the refillable reservoir was filled. Another example can include an amount of print substance expected to be used based on an amount of print substance actually used in a selected historical period of time. For instance, a print substance usage parameter can be determined for an upcoming period based on an actual amount of print substance used for a corresponding historical period of time or corresponding historical periods of time. In an example, a print substance usage parameter can be determined for an upcoming month of December based on amount of print substance used in the month of December of the previous three years. Examples of the print substance usage parameter including an amount of print substance based on other measurable criteria can include an amount of print substance remaining in the refillable reservoir vis-à-vis the amount of time remaining on the service contract or the life of the printing device for cases in which the end of the service contract or end of the life of the printing device is near. In such cases, for example, a user may not wish to fill the refillable reservoir to capacity with the print substance, and the print substance usage parameter can vary with time as date of the end of the service contract or expect life of the printing device approaches. In one example, the controller can store in memory for later retrieval information regarding the service contract, the time (including date) the printing device was put into service, the amount and kind of use the printing device has been subjected to, which may be provided or supplemented from signals provided from sensors on the printing device or other inputs, or other information that the controller may apply to determine the print substance usage parameter.

Additionally, independent print substance usage parameters can be determined for each refillable reservoir in a printing device. In one example, a printing device may include a refillable reservoir for each of the subtractive colors and black print substances. In the case of multiple refillable reservoirs in a printing device, the print substance usage parameter detected based on the signal provided from the sensor operably coupled to one refillable reservoir can be independent of print substance usage of any other refillable reservoir. In this example, a first print substance usage parameter from a first print substance reservoir configured to include one color print substance in a cyan, magenta, yellow, or black printing device can be independent of a second print substance usage parameter from a second print substance reservoir configured to include another color print substance. Further, the first and second print substance usage parameters could be of different types such as the first print substance parameter can include use of the first print substance and the second print substance parameter can include amounts of the second print substance based on other measurable criteria.

The fill level of the refillable reservoir is dynamically adjusted with the print substance usage parameter at 104. For example, the dynamically adjusting the fill level can include dynamically adjusting an upper fill level or dynamically adjusting a lower fill level. The refillable reservoir includes a capacity, and the dynamically adjusting the fill level includes dynamically adjusting the upper fill level to less than the capacity of the refillable reservoir. In one example, the capacity of the refillable reservoir can include generally the maximum amount, such as the maximum volume, of print substance the refillable reservoir can contain. For example, the upper fill level can be used to determine how much print substance to receive into the refillable reservoir, such as a dynamically adjusted preferred amount of print substance to receive into the refillable reservoir, based on the print substance usage parameter. In one example, the printing device can consider the refillable reservoir to be full when the print substance has reached the upper fill level even if the amount of print substance within the refillable reservoir is less than the capacity of the refillable reservoir. In such a case, the refillable reservoir is effectively full even if it may not be actually full. The lower fill level can be used to determine how much print substance to deplete from the refillable reservoir, such as a dynamically adjusted lower limit of print substance, based on the print substance usage parameter. In one example, the refillable reservoir is empty, or at empty, if generally all print substance, such as all print substance save some residual amount, has been depleted from the refillable reservoir. The lower fill level can be set to indicate the refillable reservoir is depleted even if the amount of the print substance within the refillable reservoir is greater than empty. The lower fill level can be used to indicate to a user to fill the refillable reservoir or, in some examples, to shut off operation of the printing device. Dynamically adjusting the fill level can include dynamically adjusting the upper fill level to an amount less than the capacity of the refillable reservoir. In one example, the print substance can be received into the refillable reservoir using a pump to draw the print substance from a print substance supply, and the pump will cease to draw the print substance upon the print substance reaching the upper fill level in the refillable reservoir. Dynamically adjusting the fill level can include dynamically adjusting the lower fill level to an amount of print substance greater than an empty refillable reservoir generally devoid of print substance. In one example, a notification to provide a print substance to the refillable reservoir is generated in response to a print substance amount in the refillable reservoir at the lower fill level. In one example, dynamically adjusting a fill level of the refillable reservoir with the print substance usage parameter includes dynamically adjusting both the upper fill level and the lower fill level.

The upper fill level can be used to determine how much print substance to receive into the refillable reservoir based on the print substance usage parameter. The upper fill level can be dynamically adjusted with respect to the capacity of the refillable reservoir based on the print substance parameter to indicate an effectively full status of the refillable reservoir. In the examples of a relatively high rate of consumption of the print substance in the refillable reservoir or a relatively long expected life of the printing device, the upper fill level can be dynamically adjusted to be closer to capacity of the refillable reservoir. In contrast, in the examples of a relatively low rate of consumption of the print substance in the refillable reservoir or a relatively short expected life of the printing device, the upper fill level can be dynamically adjusted to be further from capacity of the refillable reservoir. When the print substance received into the refillable reservoir reaches the upper fill level, the printing device can indicate the refillable reservoir is full and stop further filling of the reservoir. In one example, the upper fill level can be continuously updated, such as with the passage of time as the end of contract life approaches, or as the rate of print substance consumption varies. As the end of contract life approaches, the upper fill level may decrease. These decreases may be offset or enhanced as the rate of consumption increases or decreases, respectively. The capacity may be greater, at times substantially greater, than the upper fill level.

The lower fill level can be used to determine how much print substance to deplete from the refillable reservoir based on the print substance usage parameter. The lower fill level can be dynamically adjusted with respect to an empty refillable reservoir based on the print substance parameter to indicate an effectively depleted status of the refillable reservoir. In the examples of a relatively high rate of consumption of the print substance in the refillable reservoir or a relatively longer time that a refill supply of print substance can be provided to the printing device, the lower fill level can be dynamically adjusted to be an amount of print substance further from empty of the refillable reservoir. In contrast, in the examples of a relatively low rate of consumption of the print substance in the refillable reservoir or a relatively short expected time that a refill supply of print substance can be provided to the printing device, the lower fill level can be dynamically adjusted to be an amount of print substance closer to empty of the refillable reservoir. In one example, the lower fill level can be continuously updated, such as with the passage of time as the end of contract life approaches, or as the rate of print substance consumption varies. As the end of contract life approaches, the lower fill level may decrease. These decreases may be offset or enhanced as the rate of consumption increases or decreases. When the print substance in the refillable reservoir reaches the lower fill level, the printing device can indicate the refillable reservoir is depleted (effectively empty) and notify a user or make use of a print saving mode to conserve the remaining print substance. The lower fill level can also be used to indicate to a user the effective empty of the refillable reservoir for other determinations despite that the actual amount of print substance remaining in the refillable reservoir may be more, at times substantially more, than an actually empty refillable reservoir. In some examples, the print usage parameter can include information such as an amount of print substance remaining in a supply that is used to refill the refillable reservoir. The lower fill level can be dynamically adjusted to receive the entire remaining print substance from the supply. Still further, the print substance usage parameter can include a consideration of the age of the print substance such as the time since the last fill of the refillable reservoir. In this example, the lower fill level can be dynamically adjusted to recommend a fill to provide a newer print substance into the refillable reservoir.

In the case of printing device having multiple refillable reservoirs, the dynamically adjusted fill level for each refillable reservoir can be determined independently from the other refillable reservoirs. For examples, a printing device may include a generally same amount of capacity for each refillable reservoir configured to receive a subtractive color print substance, but based on print substance usage parameters, the printing device may use more of a first subtractive color print substance, such as cyan, than a second subtractive color print substance, such as yellow. The upper fill level of a refillable reservoir containing the cyan print substance can be dynamically adjusted to be closer to capacity of the refillable reservoir than the upper fill level of a refillable reservoir containing the yellow print substance. Similarly, the lower fill level of the refillable reservoir containing the yellow print substance can be dynamically adjusted to be closer to empty of the refillable reservoir than the lower fill level of a refillable reservoir containing the cyan print substance.

The example method 100 can be implemented to include hardware devices, programs, or hardware device and programs for controlling a system having a processor and memory, that can dynamically adjust a print substance fill level of a refillable reservoir in a printing device with a detected print substance usage parameter. For example, methods 100 can be implemented as a set of executable instructions stored in a computer memory device for controlling the processor.

Figure 2:
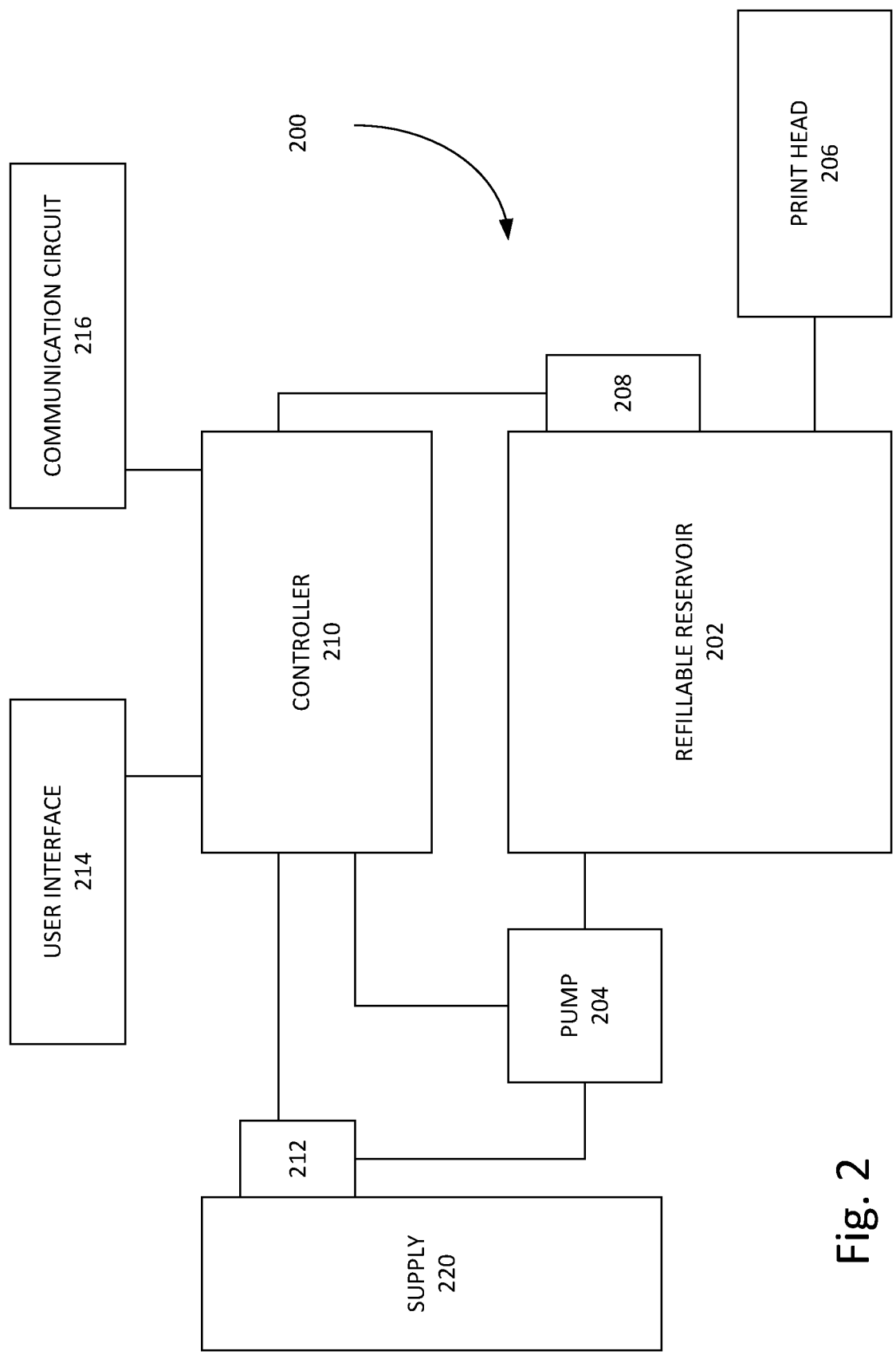
FIG. 2 is a block diagram illustrating an example printing device to implement the example method of FIG. 1.

FIG. 2 illustrates an example printing device 200 that can implement example method 100 and dynamically adjust a print substance fill level with a detected print substance usage parameter. The printing device 200 includes a refillable reservoir 202 operably coupled to a pump 204 and a print head 206. The refillable reservoir 202 receives a consumable print substance provided by the pump 204 and delivers the print substance to the print head 206 for printing or marking on a medium. Examples of a print head 206 can include ink jet print heads that apply an incompressible fluid, such as a liquid, as the print substance and print heads that apply particles of a toner as the print substance. The refillable reservoir 202 is operably coupled to a sensor 208, such as a level sensor, a flow sensor, or a combination of sensor devices that can directly or inferentially detect an amount of print substance in the refillable reservoir 202. The pump 204 and sensor 208 are operably coupled to a controller 210. The controller 210 can include a combination of hardware and programming such as firmware stored on a memory device. The controller 210 can receive a signal from the sensor 208 to determine a print substance usage parameter and can provide a signal to the pump 204 to control operation of the pump 204. The controller 210 can be operably coupled to a user interface 214, such as a display or touchscreen, or to communication circuit 216 on the printing device 200.

In one example, the printing device 200 includes a refillable reservoir 202 for each color print substance of the printing device. The refillable reservoir 202 provides the main storage of the print substance color in the printing device 200. A printing device 200 in the subtractive color space can include a refillable reservoir to hold a cyan print substance, a refillable reservoir to hold a magenta print substance, a refillable reservoir to hold a yellow print substance, and a refillable reservoir to hold a black print substance. The printing device may include other refillable reservoirs to hold other print substances such as photographic black, spot colors, or other colors used in the color space. In another example, the printing device 200 can implement a greyscale color space and the refillable reservoir 202 includes a black print substance. Each refillable reservoir can be operably coupled to a corresponding sensor device or combination of sensor devices, such as sensor 208. In one example, each refillable reservoir can be operably coupled to a corresponding pump, such as pump 204. Further, each refillable reservoir can be operably coupled to a print head, such as print head 206.

The refillable reservoir 202 in one example is integrally formed with the printing device 200 and is distinguishable from a consumable cartridge or other consumable container that a user can readily remove and replace upon consumption. In the example, a supply container 220 is configured to be removably attached to the printing device 200 to provide the print substance to the refillable reservoir 202. The supply container 220 can include a supply output that is configured to be coupled to a print supply interface 212 of the printing device 200. In some examples, the print supply interface 212 can receives signals provided from a data structure located on the supply container 220 and can provide information regarding the print substance located in the container to the controller 210. The print supply interface 212 is operably coupled to the pump 204 to draw the print substance from the supply container 220 into the refillable reservoir 202 to store the print substance within the printing device 200 for use with the print head 206. In one example, the data structure may include information such as the type and amount of print substance in the supply container 220. The controller can receive the information and determine whether the print substance in the supply container 220 is compatible with a print substance intended to be included in the corresponding refillable reservoir 202. If the print substance in the supply container 220 is compatible with a print substance intended to be included in the corresponding refillable reservoir 202, the controller 210 can cause the pump 204 to draw print substance from the supply container 220 and provide the print substance to the refillable reservoir 202. The print substance may remain in the refillable reservoir 202 until the print substance is provided to the print head 206 for printing or marking on media.

The printing device 200 can implement example method 100. For example, sensor 208 can provide a signal to the controller 210 regarding the print substance in the refillable reservoir 202 that can provide the basis of the print usage parameter. Based on the print usage parameter, the controller 210 can dynamically adjust a fill level of the refillable reservoir 202. For example, the controller 210 can dynamically adjust the upper fill level to an amount less than the capacity of the refillable reservoir 202. In one example, the controller 210 can cause the pump 204 to draw print substance from the supply container 220 and provide it to the refillable reservoir 202 until the controller 210 determines the amount of print substance, such as print substance volume, within the refillable reservoir 202 has reached the dynamically adjusted upper fill level as indicated via a signal provided from the sensor 208. The user interface 214 can indicate the refillable reservoir 202 is "Full" when the print substance amount in the refillable reservoir 202 is at the dynamically adjusted upper fill level. Additionally, the communication circuit 216 can send a signal to a remote system via a computer network to indicate the refillable reservoir 202 is "Full."

In some examples, controller 210 can automatically override or disregard the upper fill level. For instance, the controller can override the upper fill level in order to empty the print substance of the supply container 220 into the refillable reservoir 202. The supply interface 212 can provide a signal to the controller 210 as to an amount of print substance in the supply container 220. In one example, the controller 210 can compare the upper fill level to the capacity of the refillable reservoir 202, and a determination can be made at the controller as to whether to adjust the upper fill level to accommodate the remaining print substance within the supply container 220 into the refillable reservoir 202. In this manner, the print substance within the supply container 220 will be emptied into the refillable reservoir. In one example, the upper fill is compared to the capacity of the refillable reservoir 202 to determine an overage amount of the refillable reservoir. If the print substance remaining in the supply container 220 can be transferred into the refillable reservoir 202 without exceeding capacity of the refillable reservoir, i.e., if the print substance remaining in the supply container 220 can be transferred into the refillable reservoir 202 such that the print substance is less than a capacity threshold, the controller can make a determination as to whether to transfer the entire print substance contents of the supply container 220. Such a determination can be based on the print substance usage parameter and other factors such as the overage amount or the amount of print substance remaining in the supply container 220 when the upper fill is reached. For instance, if the amount of print substance remaining in the supply container is equal to the amount of print substance in the refillable reservoir 202 at the upper fill level, a determination can be made to stop filling the refillable reservoir at the upper fill level even if the capacity of the refillable reservoir 202 can accommodate the print substance remaining in the supply container. If, however, the amount of print substance remaining in the supply container is a few percent of the amount of print substance in the refillable reservoir 202 at the upper fill level, a determination can be made to continue filling the refillable reservoir 202 over the upper fill level if the capacity of the refillable reservoir 202 can accommodate the print substance remaining in the supply container. Accordingly, the controller 210 can consider such factors as the amount of print substance remaining in the supply container 220, the amount of print substance in the refillable reservoir 202 at the upper fill level, the difference or ratio between the amount of print substance remaining in the supply container 220 and the amount of print substance in the refillable reservoir 202 at the upper fill level, and the capacity of the refillable reservoir in making a determination as to whether to override the upper fill level and empty the print substance from the supply container 220 into the refillable reservoir 202.

In some examples, the lower fill level can be based on the amount of the print substance remaining in the supply container 220. The controller 210 can receive information regarding the amount of print substance remaining in the supply container 220 such as after the refillable reservoir 202 has been filled from the supply interface 212 operably coupled to sensors within the supply container 220. The controller 210 can consider the amount of the print substance in the supply container 220 with the print usage parameter to dynamically set the lower fill level such that the print substance in the supply container can be emptied into the refillable reservoir 202.

When the print substance in the refillable reservoir 202 has reached the dynamically adjusted lower fill level, the controller 210 can provide an alert via the user interface 214 or the communication circuit 216 to provide print substance to the refillable reservoir 202. For example, the alert can be provided as a visualization or message on the user interface 214 or with the communication circuit 216 via a computer network to a remote system. The alert can be directed to a user of the printing device 200 or to a remote technician who is contracted to service the printing device 200. The communication circuit may provide a message to a dedicated application at the remote system or via a general-purpose communication system such as an e-mail application or text messaging application at the remote system. In another example, the lower fill level can be used to disallow the refillable reservoir to receive additional print substance such as if the end of service contract has passed.

In some examples, the user interface 214 and the communication circuit 216 can receive communication in the form of user inputs that can include data regarding life of service contract, date of service, and other information on which the print usage parameter can be based. Still further, the user inputs can include user overrides that can manually set a fill level. In a circumstance in which the print substance supply 220 is emptied before the upper fill level is reached, the controller 210 can provide and alert via the user interface 214 or the communication circuit 216 to order a new print substance supply 220 or otherwise alert a remote technician.

Figure 3:
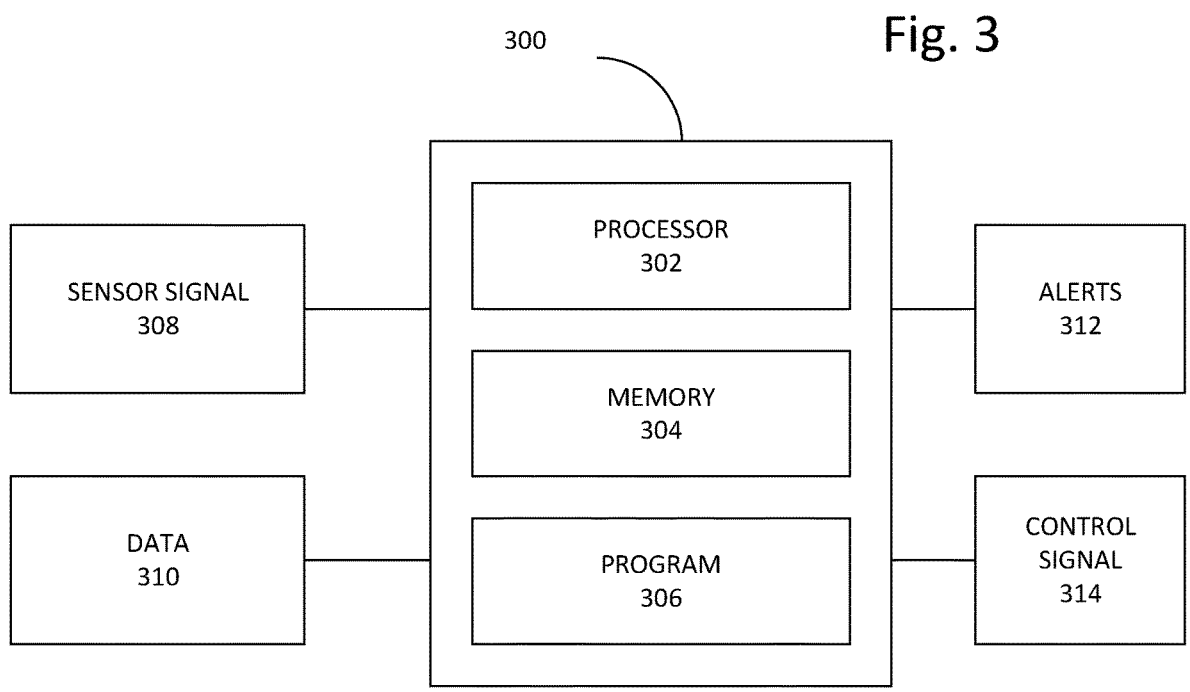
FIG. 3 is a block diagram illustrating an example system to implement the example method of FIG. 1, which can be included in the example printing device of FIG. 2.

FIG. 3 illustrates an example system 300 including a processor 302 and memory 304 and program 306 to implement example method 100. In one example, system 300 can be implemented with the controller 210 of the printing device 200. Program 306 can be implemented as a set of processor-executable instructions stored on a non-transitory computer readable medium such as memory 304 to control processor 302. Computer readable media, computer storage media, or memory may be implemented to include a volatile computer storage media, nonvolatile computer storage media, or as any suitable method or technology for storage of information such as computer readable instructions, data structures, program modules or other data. A propagating signal by itself does not qualify as storage media or a memory device.

System 300 is configured to receive a sensor signal 308 representative of an amount of print substance in the refillable reservoir 202 via the sensor 208. In some examples, the program 306 can track consumption of the print substance in the refillable reservoir 202 via the sensor 208. The program 306 can receive additional data 310 such as amount of print substance remaining in the supply container 220, amount of service life remaining in the contract, the ability of technician to service the printing device 200, rates of consumption over various periods of time, and other data that can be used to determine or affect a print substance usage parameter. Data 310 can be received via user interface 214, communication circuit 216, previously determined via controller 210 and stored in the memory 304. Based on the print substance usage parameter, the program 306 can dynamically adjusting a fill level of the refillable reservoir 202 including an upper fill level and a lower fill level. The program 306 can also provide alerts 312 to users or technicians via interfaces or communication circuits coupled to the processor 302, which may be included as part of system 300 or operably coupled to the system 300 via a computer network such as the internet. The program 306 may also generate control signals 314 such as signals to operate or turn off a pump 204 based on the fill level.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method, performed by a processor, comprising:
   determining a first print substance usage parameter from a first refillable reservoir in a printing device based on a first signal provided from a sensor operably coupled to the first refillable reservoir;
   determining a second print substance usage parameter from a second refillable reservoir in the printing device based on a second signal provided from the sensor operably coupled to the second refillable reservoir;
   dynamically adjusting a first fill level of the first refillable reservoir base on the first print substance usage parameter; and
   dynamically adjusting a second fill level of the second refillable reservoir based on the second print substance usage parameter independent of the dynamic adjustment of the first fill level.

2. The method of claim 1, wherein the dynamically adjusting the first fill level includes dynamically adjusting an upper fill level and dynamically adjusting a lower fill level of the first refillable reservoir.

3. The method of claim 2, wherein the first refillable reservoir includes a first capacity and the dynamically adjusting the first fill level includes dynamically adjusting the upper fill level to less than the first capacity.

4. The method of claim 2, comprising receiving a print substance from a print substance supply to the first refillable reservoir based on the dynamically adjusted upper fill level.

5. The method of claim 1, wherein the first print substance usage parameter is determined based on an amount of print substance consumption over a time period.

6. A printing device, comprising:
   a print head;
   a sensor;
   a first refillable reservoir operably coupled to the sensor and the print head;
   a second refillable reservoir operably coupled to the sensor and the print head; and
   a controller operably coupled to the sensor, the first refillable reservoir, and the second refillable reservoir, the controller to:
      determine a first print substance usage parameter from the first refillable reservoir based on a first signal from the sensor,
      determine a second print substance usage parameter from the second refillable reservoir based on a second signal from the sensor,
      dynamically adjust a first fill level of the first refillable reservoir based on the first print substance usage parameter, and
      dynamically adjust a second fill level of the second refillable reservoir based on the second print substance usage parameter independent of the dynamic adjustment of the first fill level.

7. The printing device of claim 6, wherein the sensor is a level sensor.

8. The printing device of claim 6, further comprising:
   a pump operably coupled to the first refillable reservoir, the second refillable reservoir and the controller, the pump to provide a first print substance to the first refillable reservoir in accordance with the first fill level and provide a second print substance to the second refillable reservoir in accordance with the second fill level.

9. A non-transitory computer readable medium storing computer executable instructions that, when executed by a processor, cause the processor to:
   determine a first print substance usage parameter from a first refillable reservoir in a printing device based on a first signal provided from a sensor operably coupled to the first refillable reservoir;
   determine a second print substance usage parameter from a second refillable reservoir in the printing device based on a second signal provided from the sensor operably coupled to the second refillable reservoir;
   dynamically adjust a first fill level of the first refillable reservoir based on the first print substance usage parameter; and
   dynamically adjust a second, fill level of the second refillable reservoir based on the second print substance usage parameter independent of the dynamic adjustment of the first fill level.

10. The non-transitory computer readable medium of claim 9, wherein the instructions that cause the processor to dynamically adjust the first fill level include instructions that cause the processor to dynamically adjust an upper fill level and a lower fill level of the first refillable reservoir.

11. The non-transitory computer readable medium of claim 10, wherein the instructions are executable to cause the processor to operate a pump to provide a first print substance to the first refillable reservoir according to the upper fill level.

12. The non-transitory computer readable medium of claim 10, wherein the instructions are executable to cause the processor to generate a notification to provide a first print substance to the first refillable reservoir when a print substance amount in the first refillable reservoir is at the lower fill level.

* * * * *